(12) United States Patent
Stade

(10) Patent No.: US 7,242,797 B2
(45) Date of Patent: Jul. 10, 2007

(54) METHOD AND APPARATUS FOR MAPPING DEFECTS ON THE LIGHT TRANSMISSIVE SUPPORT SURFACE OF A DOCUMENT SCANNING OR PHOTOCOPYING DEVICE

(75) Inventor: Mark Richard Stade, Troutdale, OR (US)

(73) Assignee: Seiko Epson Corporation, Tokyo (JP)

( * ) Notice: Subject to any disclaimer, the term of this patent is extended or adjusted under 35 U.S.C. 154(b) by 641 days.

(21) Appl. No.: 10/455,714

(22) Filed: Jun. 5, 2003

(65) Prior Publication Data

US 2004/0247202 A1    Dec. 9, 2004

(51) Int. Cl.
G06K 9/00 (2006.01)
G06K 15/00 (2006.01)
G06T 5/00 (2006.01)
H04N 1/407 (2006.01)
H04N 1/409 (2006.01)
G01N 21/00 (2006.01)

(52) U.S. Cl. ............ 382/149; 382/112; 358/3.26; 356/239.8

(58) Field of Classification Search ............ 382/145, 382/112; 358/3.26; 356/239.8
See application file for complete search history.

(56) References Cited

U.S. PATENT DOCUMENTS

| | | | |
|---|---|---|---|
| 5,214,470 A | 5/1993 | Denber | |
| 5,436,979 A | 7/1995 | Gray et al. | |
| 5,640,238 A * | 6/1997 | Nakano et al. | .......... 356/237.3 |
| 6,035,072 A * | 3/2000 | Read | .......... 382/275 |
| 6,437,358 B1 | 8/2002 | Potucek et al. | |
| 6,465,801 B1 | 10/2002 | Gann et al. | |
| 2002/0071135 A1 | 6/2002 | Takeda et al. | |

FOREIGN PATENT DOCUMENTS

| | | |
|---|---|---|
| JP | 61-198960 | 9/1986 |
| JP | 6-258729 | 9/1994 |

* cited by examiner

Primary Examiner—Jingge Wu
Assistant Examiner—Randolph I Chu
(74) Attorney, Agent, or Firm—Mark P. Watson

(57) ABSTRACT

The invention is directed to a method and apparatus for mapping defects on a light transmissive support surface of a document scanning or photocopying device. The method includes a step of cleaning the support surface between steps of operating the device so as to reflect light from defects associated with the support surface. At least a selected characteristic of the reflected light, such as its intensity, at predetermined pixel locations before the step of cleaning is compared with the same characteristic of the reflected light at the same pixel locations after the step of cleaning. A selected pixel location is mapped to a defect map if (1) the characteristic for reflected light is substantially equal for the selected pixel location at each step of operating the device, and (2) the characteristic for the reflected light at a step of operating the device substantially meets a predetermined standard.

23 Claims, 3 Drawing Sheets

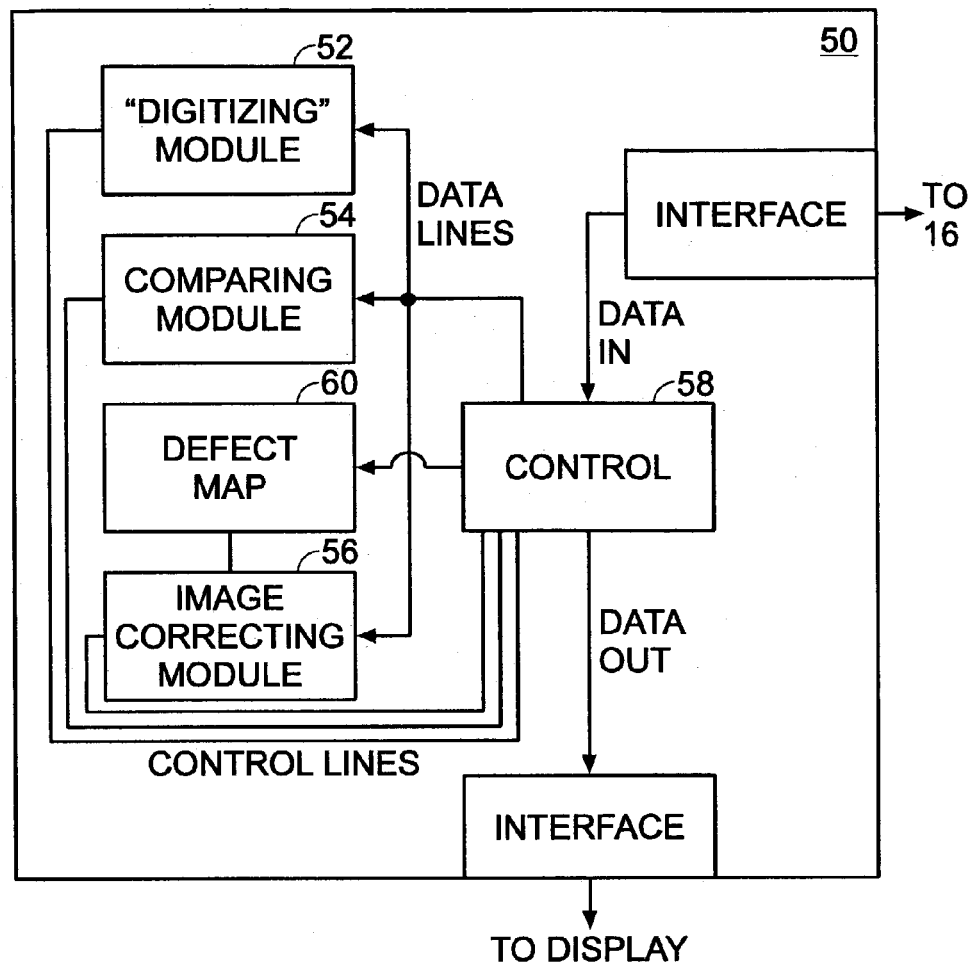
Fig. 5
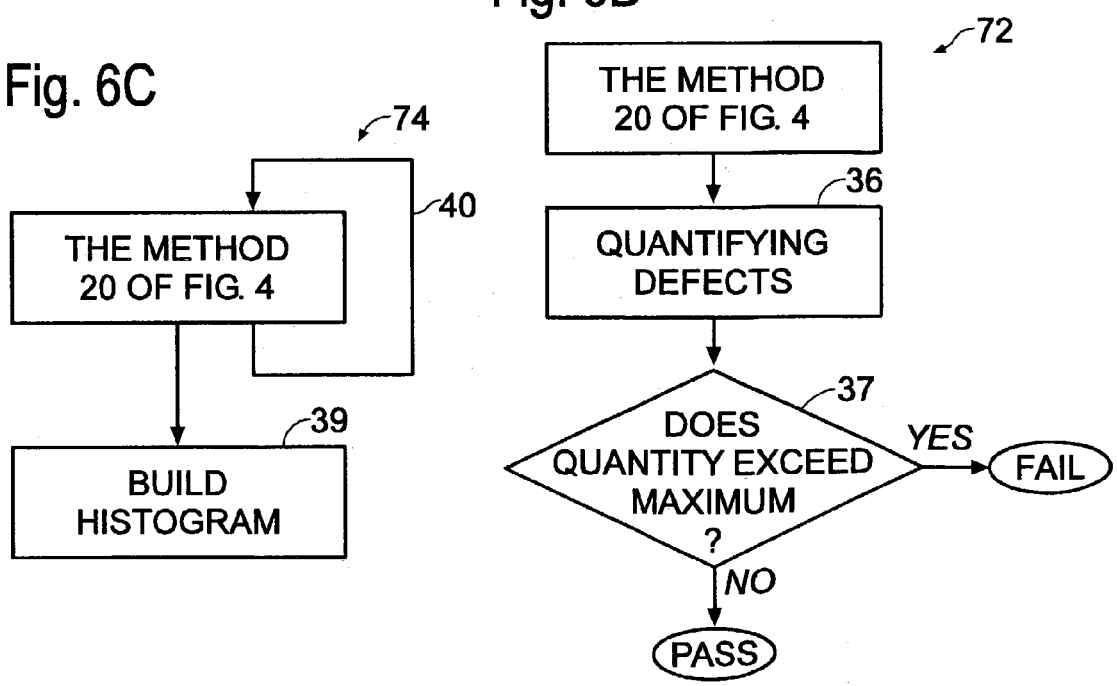
Fig. 6C
Fig. 6B

METHOD AND APPARATUS FOR MAPPING DEFECTS ON THE LIGHT TRANSMISSIVE SUPPORT SURFACE OF A DOCUMENT SCANNING OR PHOTOCOPYING DEVICE

FIELD OF THE INVENTION

The present invention relates to a method and apparatus for mapping defects on the light transmissive support surface of a document scanning or photocopying device, such as the platen glass surface of a flatbed scanner or copier.

BACKGROUND OF THE INVENTION

Flatbed scanning or copying devices, or "multi-function peripherals" (MFPs) typically provide a glass plate for supporting a document to be scanned or copied by the device. Light for illuminating the document is transmitted through the glass plate to the document, and the light is reflected by the document back through the glass plate to light sensitive components in the device to produce an image of the document. Therefore, any light blocking or light scattering defects on the glass plate will leave an "artifact" on the image, distorting or corrupting the image.

Such defects are either transitory or non-transitory. Transitory defects, such as dust, hair, and chemical deposits, are generally removable, though it is recognized herein that some of these otherwise transitory defects may not be accessible for removal by a user of the device because the deposits have become lodged on the underside of the platen glass. This is a not uncommon occurrence in low-end, consumer type scanners which may not be sealed well against such incursions. Non-transitory defects, such as scratches and pits in the glass, are not removable. Both types of defects are common, particularly in relatively inexpensive consumer grade scanning devices.

Defects can be accounted for and the image can be corrected using known interpolation techniques. This accounting can be done initially at the factory and at any time by the user during use of the apparatus, and is preferably done throughout the life of the apparatus because defects will typically accrue through use. In a prior art methodology, the platen glass is wiped clean, and it is assumed that any defects remaining are permanent. The apparatus is then used to image the platen without a document, so that all of the reflected light corresponds to the remaining defects. An interpolation algorithm is used to interpolate between pixels corresponding to locations on the platen glass for which no reflected light is received that span one or more pixels for which reflected light is received. However, a number of the defects remaining after a cleaning may actually be transitory defects that have merely been moved from one location on the platen glass to another. Similarly, cleaning can often add defects to the platen glass, by transferring defects existing on or in a cleaning device, such as dust or lint on or in a cloth.

It is recognized herein that it is undesirable to correct the image for defects that are transitory because these may either be removed or moved during use (hereinafter "removable"). Further, correction imposes a cost in image quality, as some information is typically lost in interpolating, so that correction will introduce distortion if it is not needed, or if it is applied at an inappropriate location.

Accordingly, there is a need for a method and apparatus for mapping defects on the light-transmissive support surface of a document scanning or photocopying device that provides for distinguishing defects for which image correction should be performed as a result of the defects being permanent, and defects for which image correction should not be performed as a result of the defects being removable even though they may not actually have been removed.

SUMMARY OF THE INVENTION

The invention disclosed herein is a method and apparatus for mapping defects on the light transmissive support surface of a document scanning or photocopying device. The invention is directed to a method for mapping defects on the light transmissive support surface of a document scanning or photocopying device that includes a step of cleaning the support surface between steps of operating the device so as to reflect light from defects associated with the support surface. At least a selected characteristic of the reflected light, such as its intensity, at predetermined pixel locations before the step of cleaning is compared with the same characteristic of the reflected light at the same pixel locations after the step of cleaning. A selected pixel location is mapped to a defect map if (1) the characteristic for reflected light is substantially equal for the selected pixel location at each step of operating the device, and (2) the characteristic for the reflected light at a step of operating the device substantially meets a predetermined standard.

In addition, the invention is directed to an apparatus for mapping defects on the light transmissive support surface of a document scanning or photocopying device. The apparatus has a light source for illuminating the support surface and a light receiver for receiving light reflected from the support surface at two different times at the resolution of a plurality of pixels corresponding to the support surface. The apparatus also has a comparing module for comparing a selected characteristic of the reflected light received by the light receiver at predetermined pixel locations at the two times. In addition, a memory is provided. The apparatus has a control module for mapping a selected pixel location into the memory if (1) the characteristic for reflected light at each of the two times is substantially equal, and (2) the characteristic for the reflected light at least one of the two times meets a predetermined standard.

Therefore, it is an object of the present invention to provide a novel and improved method and apparatus for mapping defects on the light transmissive support surface of a document scanning or photocopying device. It is another object of the present invention to provide such a method and apparatus that provides for distinguishing defects for which image correction should be performed as a result of the defects being permanent, and defects for which image correction should not be performed as a result of the defects being removable even though they may not actually have been removed.

These and other objects, features and advantages of the present invention will be more readily understood upon consideration of the following detailed description of the invention, taken in conjunction with the following drawings.

BRIEF DESCRIPTION OF THE DRAWINGS

FIG. 5 is a schematic view of a portion of an apparatus for mapping defects on the light transmissive support surface of a document or photocopying device according to the present invention.

FIG. 6B is a flow-chart diagram of a method for performing a pass-fail test according to the present invention.

FIG. 6C is a flow-chart diagram of a method for constructing a histogram of defects for monitoring a manufacturing process according to the present invention.

DETAILED DESCRIPTION OF A PREFERRED EMBODIMENT

Figure 1:
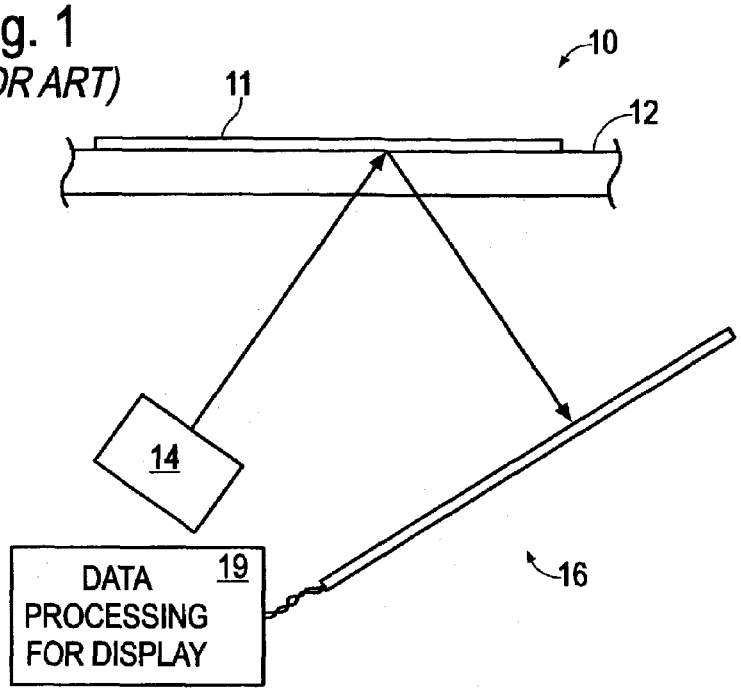
FIG. 1 is a schematic view of a prior art document scanner or photocopying device.

Referring to FIG. 1, a document scanning, photocopying, or MFP device, is referenced as 10. The device 10 generally produces images of documents laid on a light transmissive platen glass 12 which supports the document 11 to be scanned or copied. The present invention is particularly adapted for use with such a device; however, the principles of the invention may be applied in other contexts with suitable modification.

A light source 14 is positioned below the platen glass for illuminating a document 11 through the platen glass 12. Particularly, light from a light source 14 is transmitted through the platen glass 12 and reaches the document 11, and is thereafter reflected by the document and transmitted back through the platen glass to a light receiver 16. (Additional components found in the light path are omitted as being not particularly pertinent to the invention.) Where there is no document 11 on the platen glass 12, the light transmitted through the platen glass does not return to the light receiver 16. Data from the light receiver 16 is processed with a data processor 19 for immediate or eventual display of an image of the document.

Figure 2:
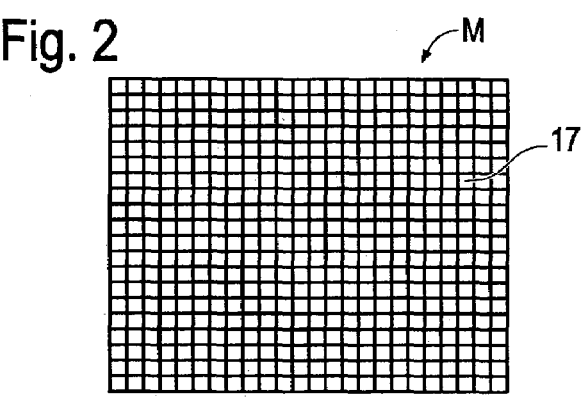
FIG. 2 is a schematic view of a memory for storing an array of pixels for use with the device of FIG. 1.

Referring to FIG. 2, the light receiver 16 includes an array of light detecting elements defining a two dimensional image array of pixels 17 that are typically stored in a memory M and represent the light received from corresponding locations on the platen glass (not shown). Typically, the array of light detecting elements is a linear array that is moved across the scanning surface to create the two-dimensional image array of pixels and the data defining each pixel may represent a combination of RGB or other color data. However, any light detecting mechanism can be employed. The two-dimensional image array of pixels forms a document image of the document 11.

The light receiver 16 is adapted so that the pixels encode or represent the intensity or the color of the light, or both intensity and color, or some other desired characteristic of the light that is received from the corresponding location on the platen glass 12. For example, in normal operation of the light receiver 16, the light intensity may be encoded as 8 bits of data and the color encoded as 24 bit data, or 8 bits for each of three selected color components.

Figure 3A:
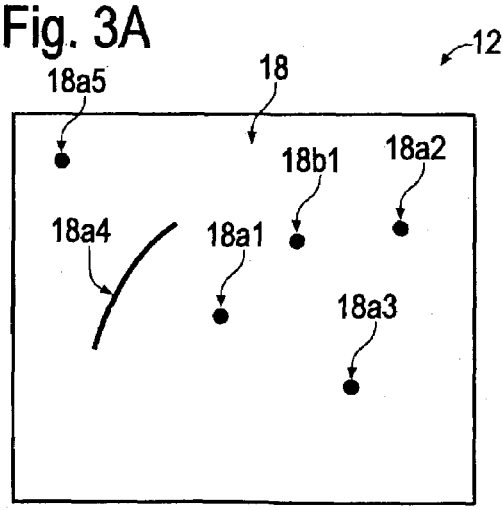
FIG. 3A is a plan view of a platen glass for the device of FIG. 1, showing a first set of positions for transitory and non-transitory defects.

Referring to FIG. 3A, the platen glass 12 is shown with a first set of defects 18. The defects typically include transitory defects 18a such as dust particles, hairs, and smudges on the glass, as well as non-transitory defects 18b, such as scratches, pits, and internal imperfections in the glass 12. All of the defects 18 produce undesirable artifacts in the images produced by the device 10 that distort or corrupt the images by reflecting or back-scattering the light from the light source 14 to the light receiver 16.

It has generally been considered desirable to correct the images produced by the device 10 for the effects of these defects. An outstanding recognition according to the present invention, however, is that it is desirable to correct the images produced by the device 10 only for the non-transitory defects 18b. The transitory defects 18a are likely to be removed through use or by cleaning, and it is recognized herein that it is not desirable to correct for defects that may not be present during use, or if present, may not be in the same positions or locations.

Figure 4:
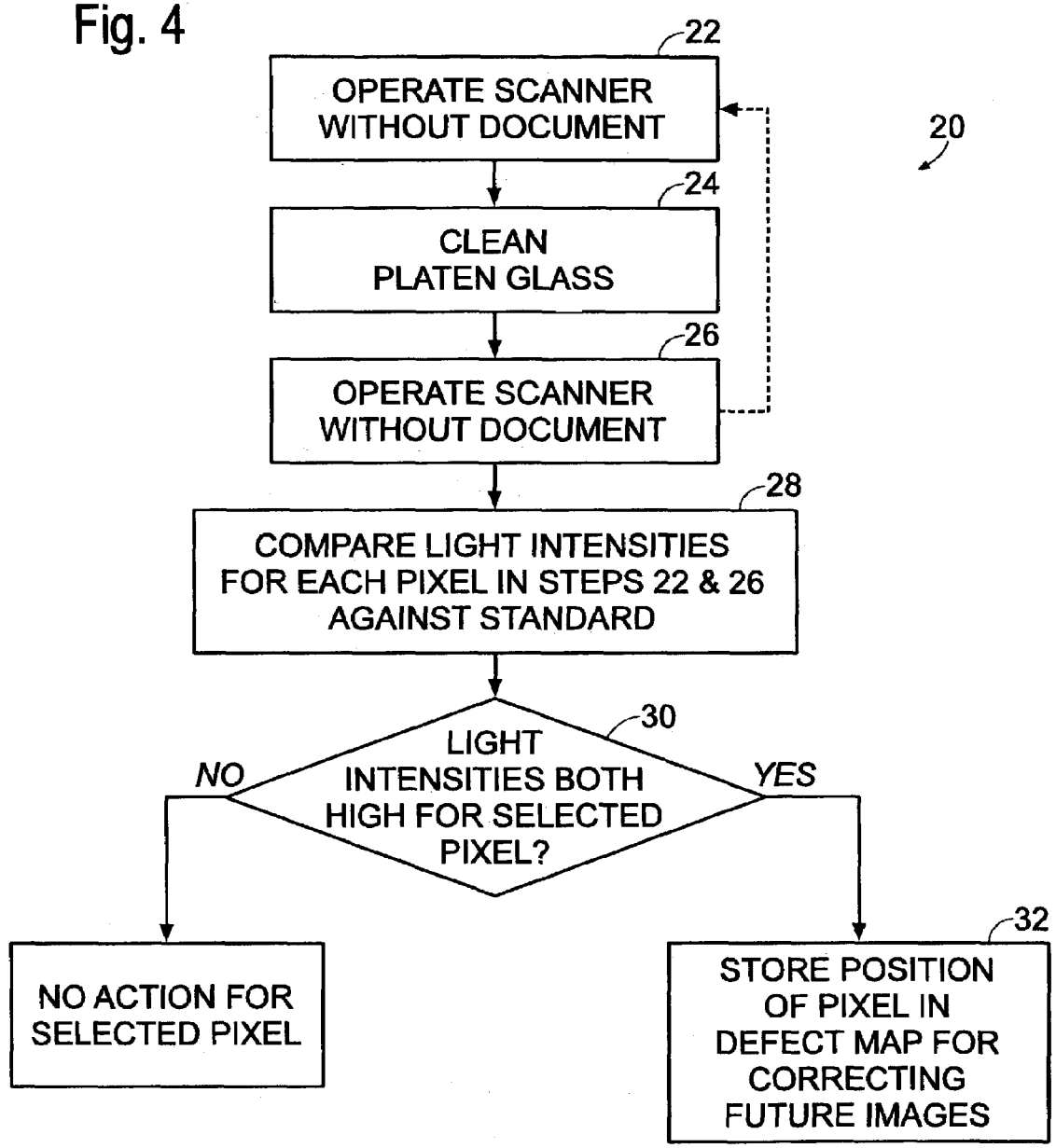
FIG. 4 is a flow-chart diagram of a method for mapping defects on the light transmissive support surface of a document scanning or photocopying device according to the present invention.

Turning to FIG. 4, a method 20 for mapping defects on the platen glass 12 according to the present invention is shown. The method 20 includes two steps 22 and 26 of operating the device 10, for example, photocopying or scanning the platen glass without a document 11 in order to ensure that essentially all of the reflected light arises from the defects. If the device 10 has a lid or cover over the platen glass 12, the lid or cover is opened or removed for this purpose. It may be noted that steps 22–26 may be performed in a loop (shown dotted) as desired.

FIG. 4 illustrates that the method 20 provides a step 24 of cleaning the platen glass that is performed between the steps 22 and 26 of operating the device 10. This step 24 of cleaning can be performed in any desired manner with the aim, according to the invention, of at least moving or displacing the transitory defects 18a on the platen glass 12. It is an advantage of the present invention that it is not necessary to actually remove the defects 18a from the platen glass 12. The step 24 of cleaning is typically performed by wiping the surface of the glass 12 with a dry cloth, but cleaning may be by any desired mechanical, electrical, or chemical means, or combination thereof.

Figure 3B:
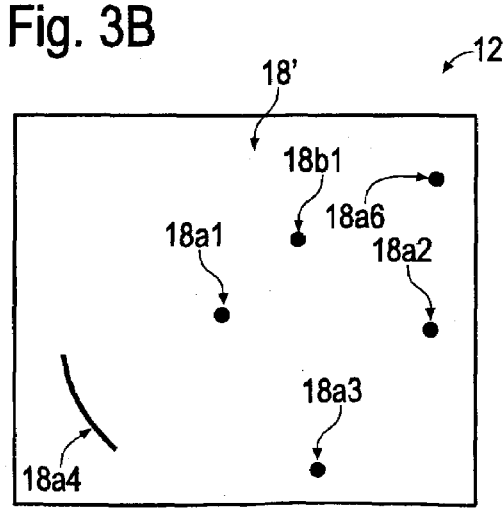
FIG. 3B is a plan view of the platen glass of FIG. 3A after a cleaning step has been performed on the glass surface according to the present invention, showing a second set of positions for the transitory and non-transitory defects.

FIG. 3B shows the platen glass 12 with a second set of defects 18' for comparison with the defect set 18 of FIG. 3A. The second set of defects 18' is produced by cleaning the platen glass 12 of FIG. 3A according to the step 24 of the method 20. The defects include both non-transitory defects 18b and transitory defects 18a.

A non-transitory defect 18b1 remains in its original position and may be, for example, a pit in the glass. It is desirable to correct the images produced by the device 10 for the non-transitory defects 18b. In addition, it is possible that some of the transitory defects 18a appear to be non-transitory because they remain in position despite the cleaning step 24. For example, the defect 18a1 may be a spot that has resisted removal by the cleaning step 24. Assuming an ordinary level of cleaning effort, it is often desirable to correct the images produced by the device 10 for transitory defects, such as 18a1, because they are likely to remain throughout further use.

For the transitory defects 18a, however, for many if not all of such defects, the cleaning step 24 will remove the defects entirely or will move the defects from one position or location on the glass 12 to another. As mentioned, it is not desirable to correct the images produced by the device 10 for defects that may not be present during use, or if present, may not be in the same positions or locations, such as these transitory defects 18a. For example, the transitory defects 18a2, 18a3, and 18a4 represent dust particles and a hair that have been displaced as a result of the cleaning 24. Moreover, the cleaning may also add transitory defects 18a to the platen glass 12, particularly if a cloth is used, by shedding particles from the cloth onto the glass. For example, defect 18 as (FIG. 3A) may be the same as defect 18a6 (FIG. 3B) and, therefore, it has been moved by the cleaning 24. Alternately, it may be that the defect 18 as was completely removed by the cleaning 24 while defect 18a6 may have been added. In any event, a comparison of the image produced in step 22 with the image produced in step 26 will generally show a difference for transitory defects 18a and will not show a difference for non-transitory defects 28b.

FIG. 4 illustrates that a step 28, according to a preferred embodiment of the invention, provides for comparing the light intensity for each pixel in steps 22 and 26 against a standard or threshold to determine if the pixel is high, corresponding to reflected light from a defect, or low, corresponding to a lack of any reflected light and therefore to the lack of a defect. (It will be appreciated that in other embodiments a high value may correspond to a lack of a defect with a low value corresponding to a defect.) The threshold value is used to determine what levels of light intensity are converted to a black or white pixel. For example, if a binary number between 0 and 255 is used to represent light intensity, values of light intensity 127 or lower may be converted to black and values 128 or higher converted to white. Thus, if light intensity is represented in this manner, the threshold or standard in the foregoing example is 128. According to the present invention, the level of the threshold is critical to obtaining an accurate map of defects. If the threshold value is set too low, an excessive amount of noise will be generated from extraneous light. On the other hand, if the threshold is set too high, reflections from subtle defects will not be captured resulting in an incomplete defect map.

The step 28 is shown as being performed after both steps 22 and 26 have been performed. However, the order is not important to the invention. For example, the step 28 may be performed after step 22 with respect to the pixels obtained from step 22 and again after step 26 with respect to the pixels obtained in step 26. The step 28 is preferably performed "on the fly" when the value of light intensity detected by a particular light detecting element is sampled. Alternatively, the light intensity values may be stored in a memory and the step 28 reads each light intensity value from the memory. The result of the step 28, that is, the determination of whether a pixel is either high or low, is preferably stored in a memory.

Any desired characteristic of the reflected light may be compared in step 28, however, light intensity is preferably used as the light determining characteristic. If the light intensity for a given pixel in step 26 is substantially the same as the light intensity in step 22, there may be a defect affecting that pixel that is non-transitory. However, the intensity could also be the same for that pixel in steps 22 and 26 if there is no defect at all. Particularly, if there is no reflected light for the pixel, the intensity of the light for the pixel in both steps 22 and 26 will be low or zero.

Referring again to FIG. 4, a step 30 of the method 20 provides for comparing images produced by the device resulting from steps 22 and 26. The comparison of the step 30 will show a difference for transitory defects 118a, and will show no difference for non-transitory defects 18b (and any transitory defects 18a that have not moved as a result of the cleaning step 24). Step 30 is performed on a pixel-by-pixel basis and determines whether the data corresponding to steps 22 and 26 for a selected pixel are both high. If so, it is recognized at step 32 that the image should be corrected at the location of the pixel according to the invention. In step 32, the location or address of the pixel is recorded in a defect map 60 (FIG. 5) that is used by the system to recognize pixels for which a defect is indicated and, therefore, for which image correction is or will be desired. Otherwise, if the data corresponding to steps 22 and 26 for the selected pixel are not both high, no action is taken. The same methodology is used as desired for all pixels contributing to a document image formed from the pixels. The method 20 may be invoked at any time and the defect map is thereby updated as desired.

It is an outstanding advantage provided by the present invention that the method 20 need not and preferably does not correct document images for transitory defects 18a that were positionally affected by the cleaning step 24, that is, defects for which the light intensities are not the same before and after the cleaning.

Figure 6A:
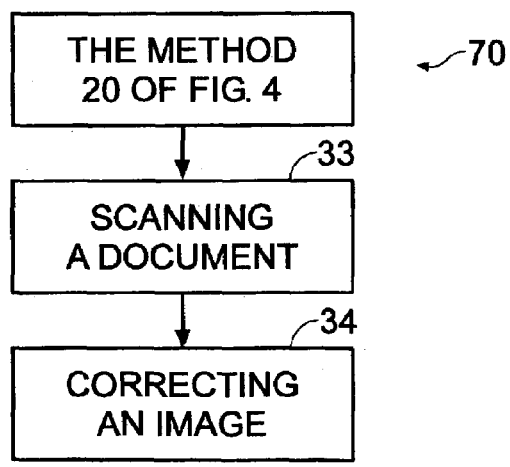
FIG. 6A is a flow-chart diagram of a method for correcting an image according to the present invention.

Referring to FIG. 6A, a method 70 for correcting an image according to the present invention is shown. According to the method 70, the method 20 of FIG. 4 is performed to obtain a defect map 60, an image of a document is obtained in a scanning step 33 and, in a correction step 34, defects are corrected in any known manner. A typical and preferred correction algorithm interpolates between pixels for which correction is not desired, where the pixels used for interpolation "span" the pixel or pixels for which correction is desired. The correction step 34 is typically invoked for images created subsequent to the generation of a defect map 60 according to the method 20. Alternatively, the correction step 34 may be invoked for any pre-existing image, that is, the correction step 34 may be performed by a step 33 that is performed for an image created before the method 20 is performed.

Referring to FIG. 5, a data processing circuit 50 according to the present invention for implementing the aforementioned steps is shown, the processing circuit replacing the processor 19 in FIG. 1. A "digitizing" module 52 corresponding to step 28 in FIG. 4 is provided for comparing the light intensity values for each pixel in the image of the platen glass 12 in FIG. 3A and the corresponding pixel in the image of the platen glass in FIG. 3B (corresponding to steps 22 and 26 in FIG. 4) against a standard, threshold value to determine whether the data are high or low as discussed above.

A comparing module 54 corresponding to step 30 in FIG. 4 is also provided for determining whether the "digitized" data corresponding to steps 22 and 26 for a given pixel are both high.

An image correcting module 56, corresponding to the above-described correction step 34 corrects document images produced by the device 10 for the artifacts produced by the non-transitory defects 18b, and any transitory defects 18a that have not moved as a result of the cleaning step 24, but not the artifacts produced by the transitory defects 18a that show differences in step 28 as a result of the cleaning step 24.

A control module 58 receives data from the light receiver 16, controls and routes data to the modules 52–56 as required, and creates the defect map 60 used by the image correcting module 56 to determine the locations for image correction. The defect map is preferably stored in some form of nonvolatile memory. As will be readily appreciated by persons of ordinary skill in the art, the implementation of the method by the processing circuit 50 may be accomplished in hardware, software, or any combination thereof as desired.

The method provides a superior means for characterizing the number and extent of defects on or in the platen glass 12, because the method eliminates consideration of transitory defects that are displaced, removed, or added by cleaning.

The method is preferably provided as an end-user selectable option, and invoked as a maintenance routine, though the method has many uses in the manufacturing process as well, such as in quality assurance and quality control. In addition to being used for factory calibration of the device 10, the method may be used to provide a superior "pass-fail" test for identifying manufacturing failures at the end of the manufacturing line. The method may also be used to provide a superior means for monitoring the manufacturing process, such as by providing data for constructing a histogram of defects on a number of instances of the platen glass, to determine whether there are systematic defects in the manufacturing process, either as a result of manufacture of the device 10 or manufacture of the platen glass 12.

FIG. 6B shows a method 72 for performing a pass-fail test according to the present invention. The method 72 shown in FIG. 6B may be employed at the end of a manufacturing line to identify articles of platen glass 12 that do not meet quality standards. The method 72 may be performed on unassembled articles of platen glass 12, but is preferably performed after final assembly of the document scanner, photocopier, MFP, or other device. The method 72 includes the method 20 of FIG. 4 and a step 36 in which the defect map 60 is quantified. The step 36 of quantifying defects may include, for instance, simply counting the number of defects that are larger than a particular size, though other methods may be employed. In a step 37, the result of step 36 is compared to a predetermined maximum number of defects. A platen glass 12 with a number of defects in excess of the maximum is deemed to not meet a particular standard of quality and is accordingly failed. Similarly, a platen 12 is passed if it has fewer defects than the predetermined maximum number.

FIG. 6C illustrates a method for constructing a histogram of defects, which may be used to identify systematic defects in the manufacturing process. This method includes the method 20 and a step 39 of creating a graphical or other representation of defects occurring on at least one glass platen. Preferably, the graphical representation is a histogram that shows the frequency and location on the platen glass 12 of defects occurring in a plurality of articles of platen glass. In order to provide the step 39 with defect data for a plurality of articles of platen glass 12, the method 20 is repeated a number of times, as indicated by the arrow 40. Preferably, the step 38 is performed enough times to provide a statistically valid sample with a desired degree of confidence. Like the method 72, the method 74 shown in FIG. 6C may performed on unassembled articles of platen glass 12, but is preferably performed after final assembly of the document scanner, photocopier, MFP, or other device.

It is to be recognized that, while a particular method and apparatus for mapping defects on the light transmissive support surface of a document scanning or photocopying device has been shown and described as preferred, other configurations and methods could be utilized, in addition to those already mentioned, without departing from the principles of the invention.

In one embodiment, the above-described method for mapping defects may be embodied in a machine readable medium as a program of instructions. The program of instructions is suitable for execution by a machine. The method includes one step of receiving pixel data corresponding with light reflected from defects associated with a light-transmissive support surface of a document scanning or photocopying device before the support surface is cleaned. In addition, the method includes another step of receiving pixel data corresponding with light reflected from defects associated with the light-transmissive support surface after the cleaning. Following these steps, at least one selected characteristic of the reflected light at predetermined pixel locations before the support surface is cleaned is compared with the same characteristic of the reflected light at the same pixel locations following the cleaning of the support surface. The method additionally includes a step of mapping a selected pixel location. A pixel location is mapped if (1) the at least one selected characteristic for reflected light before the support surface is cleaned is substantially equal to the same characteristic of reflected light of the selected pixel location after the surface is cleaned; and (2) the at least one characteristic for the reflected light substantially meets a predetermined standard. If the characteristic for the reflected light does not substantially meet the predetermined standard, the selected pixel location is not mapped.

In another embodiment, the method includes correcting one or more document images produced by the scanning or photocopying device at the mapped pixel location. The correction may include interpolating between pixels spanning the selected pixel location. In an additional embodiment, the method includes determining whether the light-transmissive support surface is acceptable or not as a result of the mapping. In yet another embodiment, the method includes determining whether a manufacturing process for the device is acceptable or not as a result of the mapping.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

The invention claimed is:

1. A method for mapping defects comprising the steps of:
    (a) cleaning a light-transmissive document support surface of a document scanning or photocopying device;
    (b) reflecting light from defects associated with said support surface before said cleaning;
    (c) reflecting light from defects associated with said support surface after said cleaning;
    (d) comparing at least a selected characteristic of the reflected light at predetermined pixel locations in step (b) with the same said characteristic of the reflected light at the same said pixel locations in step (c); and
    (e) mapping a selected pixel location if (1) said characteristic for reflected light in step (b) is substantially equal to said characteristic for reflected light in step (c) for the selected pixel location, and (2) said characteristic for the reflected light in steps (b) or (c) substantially meets a predetermined standard, and not mapping the selected pixel location otherwise.

2. The method of claim 1, wherein said selected pixel location is mapped in step (e), the method further comprising correcting one or more document images produced by the device at the mapped pixel location.

3. The method of claim 1, further comprising determining whether the support surface is acceptable or not acceptable as a result of said mapping.

4. The method of claim 1, further comprising determining whether a manufacturing process for the device is acceptable or not acceptable as a result of said mapping.

5. The method of claim 2, wherein, in step (d), the selected characteristic is the intensity of the reflected light, wherein, in step (e), said standard is a threshold low intensity corresponding to light that is not reflected as in steps (b) or (c), and the reflected light in steps (b) or (c) substantially meet said standard by exceeding said threshold.

6. The method of claim 3, wherein, in step (d), the selected characteristic is the intensity of the reflected light, wherein, in step (e), said standard is a threshold low intensity corresponding to light that is not reflected as in steps (b) or (c), and the reflected light in steps (b) or (c) substantially meet said standard by exceeding said threshold.

7. The method of claim 4, wherein, in step (d), the selected characteristic is the intensity of the reflected light, wherein, in step (e), said standard is a threshold low intensity corresponding to light that is not reflected as in steps (b) or (c), and the reflected light in steps (b) or (c) substantially meet said standard by exceeding said threshold.

8. The method of claim 2, wherein said step of correcting includes interpolating between pixels spanning the selected pixel location.

9. The method of claim 5, wherein said step of correcting includes interpolating between pixels spanning the selected pixel location.

10. An apparatus for mapping defects on a light transmissive support surface, comprising:
 a light source for illuminating a light-transmissive support surface of a document scanning or photocopying device;
 a light receiver to receive light reflected from the support surface at least two different times, said light receiver to receive the light at the resolution of a plurality of pixels corresponding thereto;
 a comparing module to compare a selected characteristic of the reflected light received by said light receiver at predetermined pixel locations at said two times;
 a memory; and
 a control module to map a selected pixel location into said memory if (1) said characteristic for reflected light at each of said two times is substantially equal, and (2) said characteristic for the reflected light at least one of said two times meets a predetermined standard, said control module to omit mapping the selected pixel location otherwise.

11. The apparatus of claim 10, further comprising a digitizing module to determine whether said characteristic for the reflected light at least one of said two times meets said predetermined standard.

12. The apparatus of claim 10, further comprising a correcting module that interpolates between pixels spanning the selected pixel location.

13. The apparatus of claim 10, wherein the document scanning or photocopying device is a flatbed scanner.

14. The apparatus of claim 10, wherein the document scanning or photocopying device is a multi-function peripheral.

15. A machine readable medium embodying a program of instructions for execution by a machine to perform a method for mapping defects, the method comprising:
 (a) receiving pixel data corresponding with light reflected from defects associated with a light-transmissive support surface of a document scanning or photocopying device before said support surface is cleaned;
 (b) receiving pixel data corresponding with light reflected from defects associated with said support surface after said cleaning;
 (c) comparing at least a selected characteristic of the reflected light at predetermined pixel locations in step (a) with the same said characteristic of the reflected light at the same said pixel locations in step (b); and
 (d) mapping a selected pixel location if (1) said characteristic for reflected light in step (a) is substantially equal to said characteristic for reflected light in step (b) for the selected pixel location, and (2) said characteristic for the reflected light in steps (a) or (b) substantially meets a predetermined standard, and not mapping the selected pixel location otherwise.

16. The machine readable medium of claim 15, wherein said selected pixel location is mapped in step (e), the method further comprising correcting one or more document images produced by the device at the mapped pixel location.

17. The machine readable medium of claim 15, the method further comprising determining whether the support surface is acceptable or not acceptable as a result of said mapping.

18. The machine readable medium of claim 15, the method further comprising determining whether a manufacturing process for the device is acceptable or not acceptable as a result of said mapping.

19. The machine readable medium of claim 16, wherein, in step (c), the selected characteristic is the intensity of the reflected light, wherein, in step (d), said standard is a threshold low intensity corresponding to light that is not reflected as in steps (a) or (b), and the reflected light in steps (a) or (b) substantially meet said standard by exceeding said threshold.

20. The machine readable medium of claim 17, wherein, in step (c), the selected characteristic is the intensity of the reflected light, wherein, in step (d), said standard is a threshold low intensity corresponding to light that is not reflected as in steps (a) or (b), and the reflected light in steps (a) or (b) substantially meet said standard by exceeding said threshold.

21. The machine readable medium of claim 18, wherein, in step (c), the selected characteristic is the intensity of the reflected light, wherein, in step (d), said standard is a threshold low intensity corresponding to light that is not reflected as in steps (a) or (b), and the reflected light in steps (a) or (b) substantially meet said standard by exceeding said threshold.

22. The machine readable medium of claim 16, wherein said step of correcting includes interpolating between pixels spanning the selected pixel location.

23. The machine readable medium of claim 19, wherein said step of correcting includes interpolating between pixels spanning the selected pixel location.

* * * * *